United States Patent
Buffo et al.

(10) Patent No.: US 9,815,504 B2
(45) Date of Patent: Nov. 14, 2017

(54) FLOW CONTROL DEVICE FOR TRUCK AND TRUCK COMPRISING SUCH FLOW CONTROL DEVICE

(71) Applicant: AIRNMOTION GmbH, Aachen (DE)

(72) Inventors: Rainer M. Buffo, Aachen (DE); Ingo Martin, Aachen (DE); Rene Tuxhorn, Aachen (DE)

(73) Assignee: AIRNMOTION GMBH, Aachen (DE)

( * ) Notice: Subject to any disclaimer, the term of this patent is extended or adjusted under 35 U.S.C. 154(b) by 29 days.

(21) Appl. No.: 14/765,940

(22) PCT Filed: Feb. 7, 2014

(86) PCT No.: PCT/EP2014/000332
§ 371 (c)(1),
(2) Date: Aug. 5, 2015

(87) PCT Pub. No.: WO2014/121937
PCT Pub. Date: Aug. 14, 2014

(65) Prior Publication Data
US 2015/0367900 A1    Dec. 24, 2015

(30) Foreign Application Priority Data
Feb. 7, 2013    (EP) .................................. 13000641

(51) Int. Cl.
*B62D 35/00*    (2006.01)
(52) U.S. Cl.
CPC .................................. *B62D 35/001* (2013.01)
(58) Field of Classification Search
CPC ........................... B62D 35/001; B62D 35/007
(Continued)

(56) References Cited

U.S. PATENT DOCUMENTS 2,579,534 A * 12/1951 Anderson ................. B64C 9/16
244/216
5,536,062 A * 7/1996 Spears ................... B62D 37/02
180/903
(Continued)

FOREIGN PATENT DOCUMENTS

DE    102009054570 A1    12/2009
DE    102009054570 A1    6/2011
(Continued)

OTHER PUBLICATIONS

Examination and Search Report dated Jun. 21, 2016 for Canadian patent application No. 2,899,974 (5 pages).
(Continued)

*Primary Examiner* — Jason S Morrow
*Assistant Examiner* — E Turner Hicks
(74) *Attorney, Agent, or Firm* — Honigman Miller Schwartz and Cohn LLP

(57) ABSTRACT

The present invention concerns an improved flow control device for a vehicle (1), especially for a truck or small van, that comprises at least one air deflector blade (10, 12), which can be installed in an operating position as an extension of the contour on a rear vehicle edge (52), which forms an air deflector area and which is installed tiltably around a swivel axis by means of an adjustment unit between the operating position (I) and a stowing position (II). The present invention further concerns a vehicle (1) that is equipped with the flow control device.

16 Claims, 11 Drawing Sheets

Figure 1:
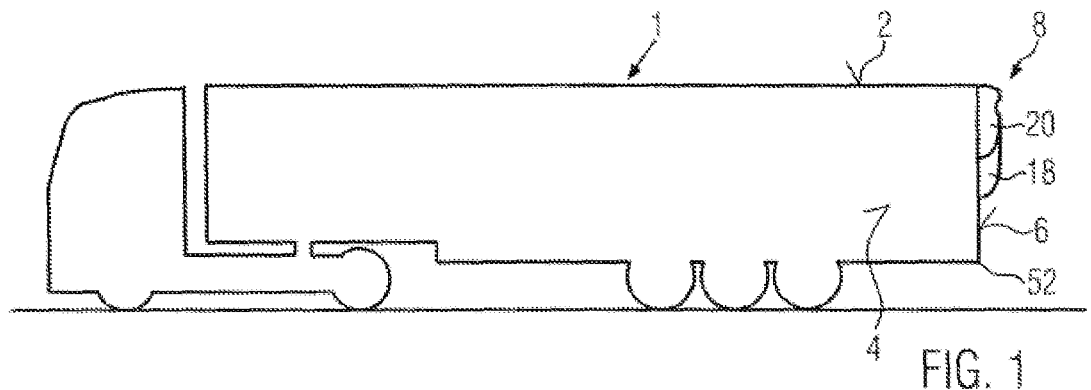

(58) Field of Classification Search
USPC ............................. 296/180.1, 180.4, 180.5
See application file for complete search history.

(56) References Cited

U.S. PATENT DOCUMENTS

| | | | | |
|---|---|---|---|---|
| 7,322,638 | B2* | 1/2008 | Larson | B62D 35/007 |
| | | | | 180/903 |
| 7,862,102 | B1* | 1/2011 | Benton | B62D 35/001 |
| | | | | 296/180.1 |
| 8,864,214 | B2 | 10/2014 | Algüera Gallego | |
| 2007/0001482 | A1 | 1/2007 | Larson | |
| 2010/0106380 | A1* | 4/2010 | Salari | B62D 35/001 |
| | | | | 701/49 |
| 2012/0223544 | A1* | 9/2012 | Benton | B62D 35/001 |
| | | | | 296/180.1 |
| 2012/0242108 | A1 | 9/2012 | Algüera Gallego | |

FOREIGN PATENT DOCUMENTS

| | | | |
|---|---|---|---|
| EP | 1738996 | A1 | 1/2007 |
| EP | 1738996 | A2 | 1/2007 |

OTHER PUBLICATIONS

Office Action and Search Report dated Jul. 5, 2016 for Chinese patent application No. 201480018610.2 (6 pages).

\* cited by examiner

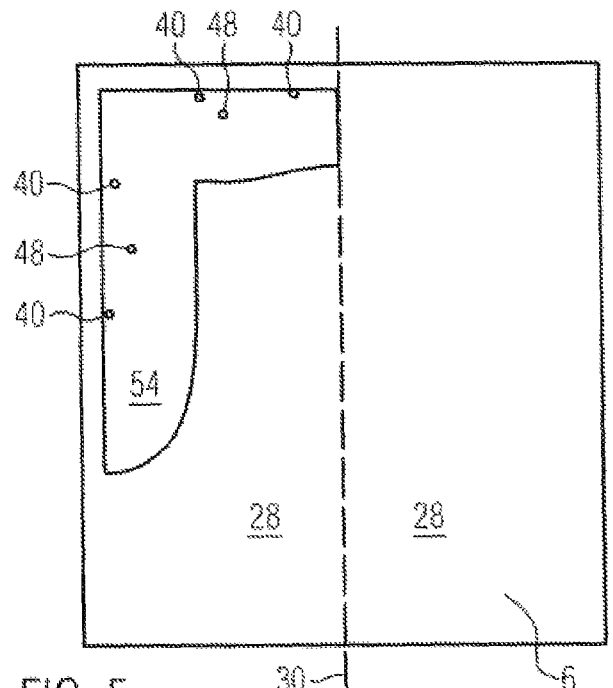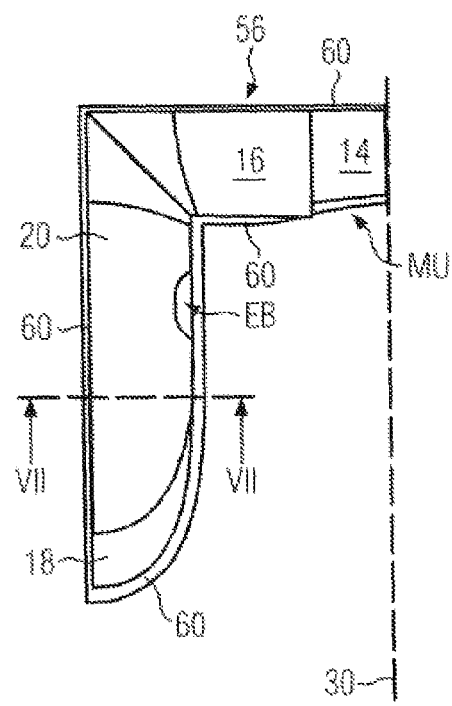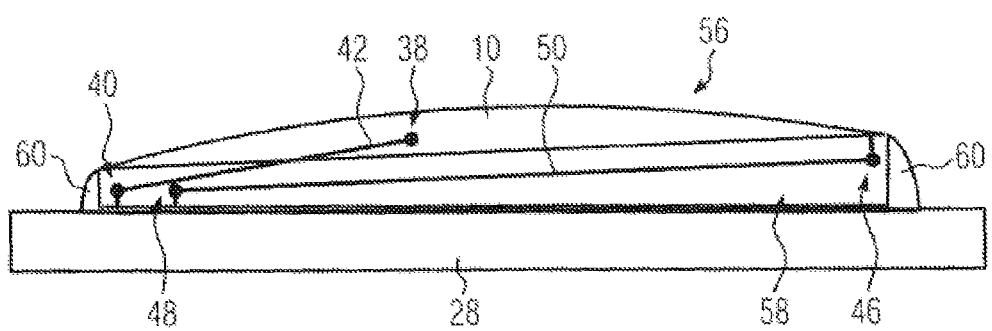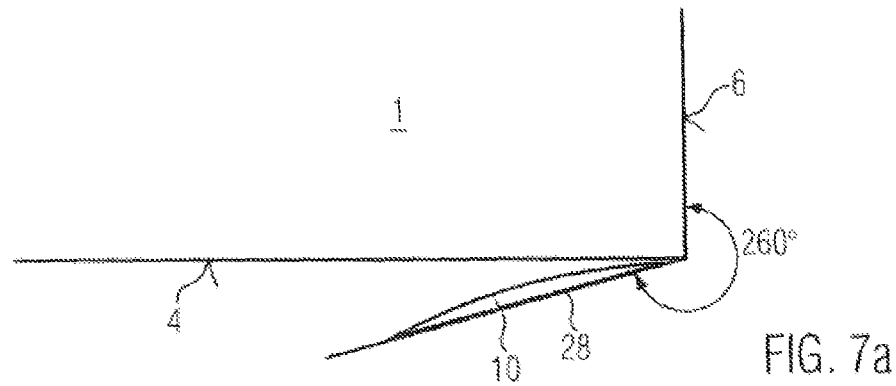

| Line | Value | Reference | Interval |
|---|---|---|---|
| L | here: 500 mm | - | (see Fig. 9a) |
| H | here: 2000 mm | - | 1200 – 2700 mm |
| [2] | 50 mm | from behind | 10 – 120 mm |
| [3] | 75 mm | from behind | 20 – 150 mm |
| [4] | 180 mm | from behind | 100 – 300 mm |
| [A] | feed E | from the top | (see Fig. 9a) |
| [B] | 250 mm | from the top | 120 – 300 mm |
| [C] | 100 mm | from [D] | 50 – 125 mm |
| [D] | center line | [B] und [F] | - |
| [E] | mirror view of [C] | sym. to [D] | - |
| [F] | 550 mm | from the top | 250 – 1000 mm |
| [G] | 700 mm | from the bottom | 0 – 1500 mm |
| [H] | 120 mm | from the bottom | 0 – 500 mm |
| [J] | angle: 3° | lower line | 0° – 50° |

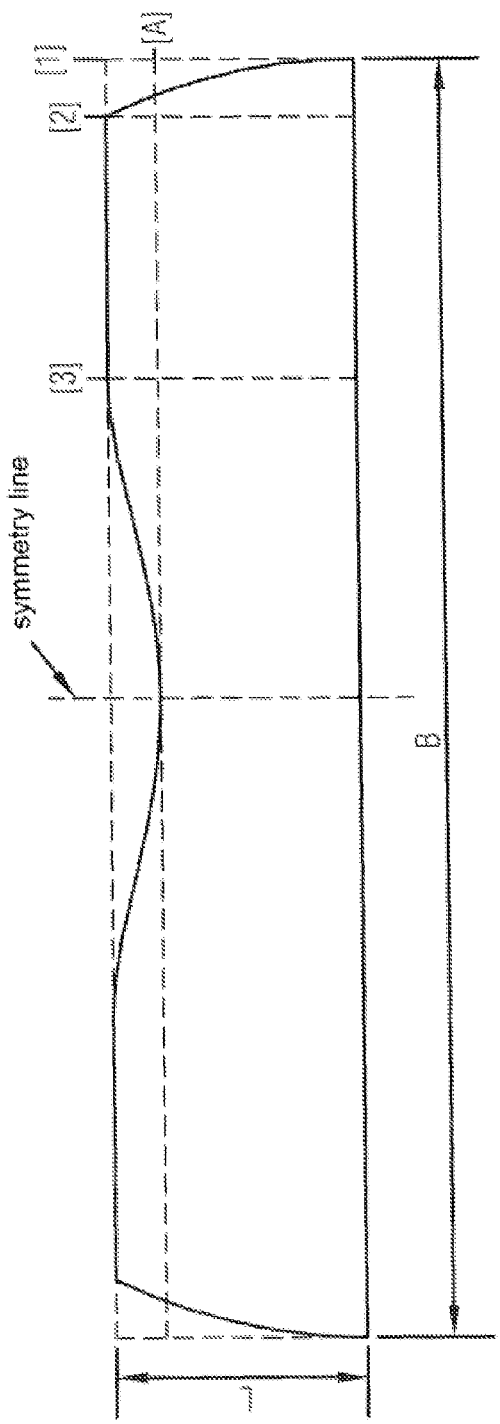

FLOW CONTROL DEVICE FOR TRUCK AND TRUCK COMPRISING SUCH FLOW CONTROL DEVICE

The present invention concerns a flow control device for a vehicle, especially for a truck or small van, that comprises at least one air deflector blade forming an air deflector area, that can be installed in an upright position in a way as to extend the contours on a rear edge of the vehicle and that is installed tiltably around a swivel axis by means of an adjustment unit between the upright position (operating position) and an inward-tilted position (stowing position).

For a truck, such a flow control device is especially meant to improve the turbulences at the rear of the truck so that the air resistance of the vehicle is reduced. Especially semi-trailers and/or trailers and trucks as such in a flatbed or canvas-covered design and/or box design essentially have a rectangular cross-section shape. The semi-trailers usually have a box shape, i.e. longitudinal side areas that are located opposite to each other, and the top areas are substantially even in a longitudinal direction, i.e. in the direction of travel, so that there is also a box-shaped design from a lateral perspective. The same applies for containers and livestock trucks. Also there, the outer contour of the freight volume defined by the truck is enclosed by a box that is rectangular in the cross-section. Such variants and the improved air control on the rear are the special areas of focus of the present invention.

Flow control devices of this type for a vehicle are known, for example from the WO 2011/019768 A2. In this state of the art, tiltable air deflector blades are installed on opposite lateral edges as well as on the upper edge of the rear of the truck, which need to be set up and locked manually. The swivel axis of one of these tiltable air deflector blades shall be installed in a fixed manner and closely to the respective edges. The air deflector blades are set upright by means of tilting around the swivel axis, i.e. to set them upright, the air deflector blades are tilted outward from a position in which the air deflector blades are essentially attached to the surface areas and/or the longitudinal side areas of the structure, so that they essentially work as a continuation of the surface areas and/or the longitudinal sides of the structure. In the state of the art according to WO 2011/019768, the air deflector blades form a pyramidal structure that reaches beyond the rear of the cargo space. A similar proposition is known from the U.S. Pat. No. 7,854,468. There, tiltable air deflector blades on the edges of the cargo space on the rear are also provided for. In a corner area between the lateral air deflector blades and an upper air deflector blade, an inward-tilted area is provided for in the stowage position, which extends the lateral areas up to the corner in the operating position. A proposition that is similar to the WO 2011/019768 A2 is known from the U.S. Pat. No. 7,726,724. The flow control device does not comply with the traffic safety requirements because the flow control device tapers off towards the rear. Flow control devices with tiltable blades are known from the U.S. Pat. No. 7,862,102 B1 and the U.S. Pat. No. 7,641,262 B2.

The solutions known from the state of the art should be improved. They hamper the opening of the rear doors to the cargo area, which usually have to be completely aligned to the outside of the vehicle when the vehicle and/or the semi-trailer or trailer is to be loaded. In other words, the doors must be tilted to the outside by approximately 260° in order to load the vehicle. The flow control devices, which have already been known from the state of the art, are normally opposed to this intended purpose as there are doors in the area of the hinges.

As proven, for instance by the proposed solution known from the U.S. Pat. No. 7,854,468 B2, there have been attempts to provide for a flow control device on both the lateral edges and the upper edge of the cargo area on the rear and to also take into account the issue that a corner area should not be left out by the flow control device in the operating mode. The previously known solution with a covered area, however, does not allow for optimized contouring of the air deflector blades in relation to the flow.

The known solutions to improve the flowing behavior on the rear lead to a contour shape of the air deflector blades that is not ideal in aerodynamic terms.

The present invention intends to make a proposition that overcomes the problems described above entirely or in part.

The solution proposed with the present invention is indicated in Claim 1. The flow control device of the invention is different from the previously known state of the art, which is expressed for example by the WO 2011/019768 A2, due to the condition that the air deflector blade comprises at least one air deflector element and at least one sliding element that can be moved, in relation to the air deflector element, translationally and in a parallel position to the swivel axis. Individual air deflector blades, preferably each air deflector blade, is formed accordingly of at least two elements, i.e. an air deflector element that is installed in an exclusively tiltable way and a translationally flexible sliding element associated with it. There is no need to say that the sliding element is also tiltable around the swivel axis. However, the sliding element can, in addition, be moved translationally and along—i.e. in parallel to—the swivel axis.

The swivel axis of the tilting movement of the solution from the invention, i.e. the central point of the current tilting movement of the air deflector blade is thereby usually not planned in a fixed way. Rather, the position of the swivel axis changes, preferably while the device is set in an upright position, so that the swivel axis is also tilted outward from an inward-shifted configuration in order to arrange the air deflector blades as evenly as possible on the rear edge of the vehicle.

The air deflector blade of the present invention is usually closed on its ventilation control side, i.e. the air deflector blade has no holes on its air deflector area. Also, the air deflector blade usually has an even, continuous shape so that flaws and edges can be avoided both on the air deflector blade as well as on the link between the vehicle edge and the air deflector blade.

In this context, the flow control device is preferably designed in a way that the sliding element in a top view is located within a sleeve area formed by the air deflector element. The sleeve area is defined by the outer contour in a top view onto the air deflector element. The air deflector element and the sliding element are arranged respectively on top of each other. In the operating position, the air deflector element and the sliding element preferably overlap at least partially or are exactly adjacent to each other with their respective edges, so that the air deflector area formed by the air deflector blade is prolonged in the extending direction of the swivel axis through the overlap of the two elements.

The flow control device according to the invention is usually designed in a way that the air deflector blades do not extend over the rear edges of the vehicles in the stowing position and that the maximum height of 4 m and the maximum width of 2.55 m, that are required for heavy goods vehicles, are not exceeded.

An air deflector blade in the sense of the present invention is formed preferably by an air deflector blade that has a self-contained hollow section. Such a variant shall usually be preferred for the air deflector element. In a self-contained hollow element, this air deflector blade normally has a convex curved outer surface and an opposite inner surface in a cross-section view, i.e. a sectional view in a right angle to the swivel axis. The outer and the inner surface preferably form front and rear edges on which the two areas are linked in a tapering manner. The hollow element can integrate hinge points for the flexible connection of the air deflector blade, as well as a guiding system and/or an actuator for the translational sliding movement of the sliding element. This can also come with a guide mechanism that comprises a helical groove so that there will also be a translational movement of the sliding element due to a tilting movement of the air deflector blade and, more precisely, due to the guide in the helical groove. Alternatively, a linear guide, which determines the sliding direction of the sliding element and which relocatably guides the sliding element on the air deflector element, can be installed between the air deflector element and the sliding element. An actuator, that triggers the translational movement of the sliding element, is usually installed between the air deflector element and the sliding element.

The actuators preferably form the adjustment unit mentioned above. The use of pneumatic actuators is recommended. In case of single-acting pneumatic cylinders, these cylinders will usually move the air deflector blade upwards from the stowing position into the operating position during pressurization. This can be done against the force of a return spring so that the pneumatic actuator is reset to its starting position, that is aligned to the stowing position, when the actuator is not exposed to internal pressure. The reset can also be achieved by the weight force, especially if the actuator is associated with a top-side air blade that is intended to favorably influence the flow as an extension of the vehicle roof and at the rear of the vehicle.

It is equally possible to set the blades exclusively in manual mode. In the process, at least one lateral air deflector blade is manually swiveled open. The required force is also used to generate the energy that is necessary to put up another air deflector blade. This way, pressure can be generated during manual positioning in a pneumatic or hydraulic system of the device from the invention, which is used to drive an actuator that is associated with another air deflector blade. This is how the lateral air deflector blade located on the opposite side as well as the upper air deflector blade can be operated, for example, through manual swiveling of a single lateral air deflector blade.

Alternatively or in addition, the actuators can also be double-acting cylinders so that the deflector blade can be actively brought back from the operating position to the stowing position as well as put up from the stowing position to the operating position by means of the actuators. The abovementioned explanations for the actuators are valid for the actuator that swivels the air deflector blade as well as for an additional actuator that might be installed for the translational movement of the sliding element.

Furthermore, pneumatic lines are provided together with the actuators, preferably within the hollow element. This ensures an aesthetic look of the flow control device according to the invention.

According to a preferred upgrade of the present invention, the flow control device has two lateral air deflector blades for the flow control on opposite lateral areas of the vehicle and one top-side air deflector blade for the flow control on a roof area of the vehicle. The top-side air deflector blade has preferably at least two air deflector elements and at least two sliding elements.

If, as part of this application, reference is made to "top", "bottom" as well as "outside/outer" and "inside/inner", this shall be understood in consideration of the condition that, although the flow control device shall be protected independently, it is installed on a truck in case of use. The abovementioned preferred variant is installed on the vehicle accordingly and in the style of a downward facing U. The variant discussed here has a downward facing aperture. This should not mean that there cannot be a bottom end as well that improves the flow control of the air that flows under the vehicle. By "top" we mean the area on which the lateral air deflector blades form, at least in the operating position, a corner area of the flow control device with the top-side air deflector blade. In the operating mode, the air deflector blades can touch each other, bump against each other or even be connected to each other in an interlocking or force-fitting manner due to the translational flexibility of the sliding element, so that a variant with a favorable effect for the air flow is also created in the corner areas. But also in the stowing position, a lateral deflector blade can form a closed corner area together with the top-side deflector blade. In this stowing position, the air deflector elements are preferably directly adjacent to each other. They can preferably touch each other in a linear way so that a substantially closed, gap-free U-shaped area, which is made up of the outer area of the air deflector blades, is also formed in the stowing position by means of the two lateral air deflector blades and the top-side air deflector blade. "At the bottom", there is frequently an unattached end of the lateral air deflector blades; this end is located opposite to the top-side air deflector blade.

According to a preferred upgrade of the present invention, at least one of the air deflector blades, i.e. also the top-side air deflector blade alone, preferably each of the lateral air deflector blades, is liftable via a swivel axis body. The swivel axis body is thereby integrated in a sleeve equipped with a helical groove. This sleeve is traversed by a joint rod that is connected to the swivel element as well as to the respective air deflector blade. The swivel axis is usually associated with an actuator that can translationally adjust the swivel axis in the axial direction. As a consequence of this adjusting movement, the joint rod moves along the helical groove in an axial direction and is necessarily also guided radially through the helical groove in the process so that the associated air deflector blade is lifted and swiveled at the same time. Modifications are possible for this precise variant. Hence, the swivel axis body can also be equipped with an outer thread which is [translator's note: verb is missing in the original text] with a thread sleeve linked to the joint rod in the thread encroachment. Also through this, the abovementioned kinematic effect (lifting and swiveling of the hinge point) is possible. The previously described upgrade is an invention itself and can also be valid without the characteristics of Claim 1. The described variant offers a simple and effective possibility for lifting and simultaneous swiveling of the air deflector blade in order to align the latter in the stowing position in a lowered and inward-tilted manner within the sleeve area of the rear of a truck and to move it up to the upper rear area in an outward tilted way.

According to a preferred upgrade of the present invention, the movement of the lateral air deflector blade, preferably of both lateral air deflector blades, is mechanically coupled with the movement of the upper air deflector blade. This coupling is ensured preferably by means of a link which mechanically couples the outer edge of the top-side air deflector blade with the upper edge of the air deflector blade. This link is installed preferably on the corners of the respective air deflector blade that face away from the vehicle and allows for a relative movement of the air deflector blades towards each other. When the top-side air deflector blade is swiveled open based on a mechanical drive, the lateral air deflector blade, for instance, is necessarily swiveled as well and also lifted out in an upward direction. Through this variant, the desired upright setting of the flow control device into the operating position can be achieved with a small number of actuators. This design example consequently allows for a more cost-efficient production of the flow control device. In this variant, the lateral air deflector blade can preferably consist of one part. The upper air deflector blade alone is equipped with a translationally flexible multi-part sliding element whose swiveling and sliding movement also adjusts the lateral one-part air deflector blade.

According to a preferred upgrade of the present invention, the top-side air deflector blade is divided opposite to a vertical axis and aligned to the latter in a mirror-symmetric way. The "center" and hence the inner part of the flow control device is preferably determined by the vertical axis which is equivalent to an axis that is rectangular to the longitudinal direction of the vehicle and that extends vertically. This vertical axis preferably sets the position of the plane of symmetry for the entire flow control device. It is preferably formed by two L-shaped segments that are designed as independent assembly units and that can be installed on the vehicle. The abovementioned vertical axis is preferably also located in a plane that is formed by the contact surface of an assembly plate on which the air deflector blade is installed flexibly and with at least one actuator. This assembly plate is used to create a pre-assembled module that can be easily installed on a vehicle so that the flow control unit can also be assembled on an existing vehicle as a simple retrofit kit. The assembly plate preferably has outward-protruding end caps that are contoured in the cross-section view and that form a self-contained sleeve together with the outer area of the air deflector blade in the stowing position. In the stowing position, the actuators, joints as well as the joint rods are respectively enclosed on the edge and consequently covered by the sleeve. The components constitute an aesthetic arrangement so that the flow control device can also be used as an advertising space in the stowing position. A different look can emerge in the process, dependent on whether the flow control device is in the stowing position or in the operating position. Hence, advertising designs of the air deflector element, that are covered by the sliding element in the stowing position, can display an aesthetic look and/or a promotional message together with the sliding element in the operating position.

In addition, the mechanics of the flow control device is protected in the stowing position.

As already mentioned before, sliding elements that are adjacent to each other in the operating position form a corner area. This corner area is usually set up by two sliding elements. One sliding element is associated with the lateral air deflector blade, the other sliding element with the top-side air deflector blade. In the operating position, these two sliding elements can be connected in a force-and/or form-fitting way so that a relative flexibility of the air deflector blades in the operating position is prevented. In this respect, particular attention is paid to a variant that prevents any rattling or knocking in the operating position in the travel speed of the vehicles that are normally driving. For this purpose, the adjacent edges of the sliding elements can also be covered with shock-absorbing materials such as a rubber lip or similar items.

The corner area, however, can also be formed by the sliding element of an upper air deflector blade and a one-part lateral air deflector blade that can be swiveled and that is flexibly arranged in parallel to its swivel axis. Thereby, a mechanic coupling between the sliding element of the upper air deflector blade and the one-part lateral air deflector blade is preferably achieved in the corner area. This coupling allows on one hand for a fixation of the air deflector blades against each other that reliably prevents any rattling and knocking in the operating position at travel speed. On the other hand, the mechanic coupling enables an adjustment of one air deflector blade, for example of the lateral air deflector blade by means of actuators associated to it, which necessarily leads to a setting of the other, in this case the upper, air deflector blade to the operating position. Equally, the upper air deflector blade can also be equipped with mechanic actuators and carry along the lateral, preferably both lateral, air deflector blade(s) through its travel motion. The mechanic coupling between the upper air deflector blade and the lateral air deflector blade is usually ensured by a linking element that punctually interconnects the two blades and that also allows for a certain swivel movement of the blades connected by it.

According to a preferred upgrade of the present invention, the adjustment unit comprises at least one articulation gear that is developed in a way that a front edge of the lateral air deflector blade or of the upper air deflector blade is offset towards the inside in the stowing position in relation to the operating position. The articulation gear is preferably developed in a way that, after assembly of the flow control device on the rear of the vehicle, the front edge in the operating position evenly connects to the rear edge of the vehicle as a contour extension. Anyway and due to the variant of the articulation gear, there will be both a translational as well as a rotatory movement of the air deflector blade as a whole during the swiveling process. The air deflector element is thereby swiveled preferably around two hinge points that are located at a distance of each other on the vehicle. These hinge points on the vehicle can also be installed on the assembly plate. In view of the desired reset of the air deflector blade to the stowing position, the hinge points on the blade are as distant from each other as possible, preferably by at least half of the length of the air deflector blade. A hinge point on the blade can thereby be located on or close to the rear edge of the blade and beyond the closed hollow element, because the outer area and the inner area there are already developed in such a tapered way that the hinge point on the blade cannot be taken in by the hollow element anymore.

Especially due to the convex curvature of the outer area, the present invention helps achieve a favorable impact on the flow at the rear edge of the vehicle.

Moreover, the flow control device according to the invention preferably has a control unit that comprises mechanisms to determine the speed of the vehicle and a mechanism to generate control values to trigger the adjustment unit. Through these control values, the air deflector blades are brought from the stowing position to the operating position or from the operating position to the stowing position by triggering the actuators. The mechanisms to generate control values are thereby developed in a way that, after the first speed limit is exceeded, the control unit sets off a positioning signal to bring the air deflection blade from the stowing position to the operating position and, as soon as the system falls below a second speed limit, a stowing signal is set off to put the air deflector blade from the operating position to the stowing position. The first speed limit can thereby be chosen to be identical to the second speed limit. This enables monitoring of the flow control device as a function of the speed. It occurs automatically and based on the speed signal.

The speed signal can, for example, be recorded by a GPS sensor which can either determine the relative speed or communicate the topology to the control unit. This enables us to identify highways and interstate motorways via a GPS sensor for which the control unit approves the transmission of a positioning signal when the vehicle enters these roads. Hence, the flow control device according to the invention will only be pulled out on interstate roads and highways and will otherwise remain in the stowing position, even if higher speeds are reached during a short period of time. This trigger of a positioning signal by the control unit can be complemented by another speed signal. The speed signal can be noticeable on the vehicle. Also, the speed signal can be taken from an interface that exists on a trailer and/or semi-trailer anyway. This interface is located on a control unit that can also be installed on a separate semi-trailer or trailer and that has other functions such as ABS, pneumatic suspension control, inter alia. Diverse signals can be taken from this control unit, for example also a signal that expresses the speed of the vehicle. Moreover, its pressurized air system can be used to trigger activators of the flow control unit based on pneumatic or other working fluids.

The control unit preferably has a delay module that stops the transmission of a positioning and/or stowing signal during a predefined period if during that period the first speed limit is undercut and/or if the second speed limit is exceeded. The period is preferably several seconds long, for example 2 to 60 seconds. If, for instance, the first speed limit is undercut again during this time interval, no positioning signal will be set off and the air deflector blades will not be put up. If, during high speed and while the air deflector blades are in the operating position, the vehicle decelerates below the second speed limit but then accelerates again within the predefined period so that the second speed limit is exceeded again, the stowing control signal will also be absent so that the air deflector blades remain in the operating position even if the second speed limit has been undercut for a short time. This control mechanism prevents the air deflector blades from being set from the stowing position to the operating position for only a short period of time.

Also a vehicle is protected with the present invention. This is especially a truck, a semi-trailer a trailer or small van, preferably in a flatbed or canvas-covered design, as a closed box, container or livestock truck as already mentioned in the introductory paragraph. In the operating position, the air deflector blade is essentially installed as an extension of the contours of an edge at the rear of the vehicle, i.e. it forms a contour with its outer area that is at first approaching the outer area of the vehicle tangentially and that regularly abuts the rear of the vehicle. The outer area of the blade is convex curved and facing the inside in the operating position so that a positive impact on the flow is ensured. The air flow is led to the inside over the outer area of the air deflector blade, essentially without tearing off from the outer area.

According to a preferred upgrade, successively arranged protrusions extend from the outer area of the vehicle in a longitudinal direction of the front edge of the air deflector blade. These protrusions are located in front of the front edge of the air deflector blade in the operating position. The protrusions can be installed on the roof area or on a side surface of the vehicle and protrude from it. The protrusions are preferably formed as bumps or buckles, i.e. variants with an essentially convex shape, designed especially as spherical elements such as hemispheres or ellipsoids. The protrusions can extend away from or be connected to a bar that is integrated in a groove that is a structural part of the rear edge of the vehicle in a way that the protrusions extend beyond the outer surface of the vehicle. Alternatively, the protrusions can also be developed as a function of the speed, for example by means of a bar that is contoured in the longitudinal direction and made of an elastic material whose attachment end is located at the rear and whose unattached end at the front in the flow direction. The arriving wind flow causes the protrusions, that are associated to the side area which is facing it while the vehicle is standing still, to take on an upright position and to protrude from the associated outer area of the vehicle in case of a sufficiently high speed. The protrusions lead to swirls on the front edge of the air deflector blade whose axes are aligned longitudinally to the front edge of the blade. In the process, momentum is constantly supplied to the boundary layer from the outside flow, whereby the boundary layer will not completely dissociate and/or tear off from the area during high back pressure in case of high setting angles, whereby the aerodynamic effect of the outer surface of the air deflector blade would be lost. At the same time, the protrusions lead to small-scale turbulences that reinforce the boundary layer on the outer surface of the air deflector blade. The flow control device according to the invention is meant to achieve a maximum change of the trailing topology of the flow, i.e. the flow should be redirected to the greatest possible extent from the outer surface of the vehicle without making the boundary layer dissociate in large parts from the outer surface. It is therefore an advantage if turbulence is supplied to the boundary layer for its enrichment with energy. Moreover, turbulence is deliberately supplied through controlled, small-scale dissociation on the rear edge to produce a thickening effect of the boundary layer. Altogether, a "supercritical boundary layer condition" is produced whereby the mostly redirected boundary layer has been thickened to such a great extent that the spin—also called vorticity—in the shear layer behind it is clearly reduced. In this sense, the previously mentioned protrusions have a favorable effect and should be located directly in front of the front edge of the air deflector blade in the flow direction.

Especially the consideration of this super-critical state, however, allows for short but effective air deflector blades that do not lead to a very tall installation height in the operating position and that allow for a cover of the joints and actuators of the air deflector blade in the stowing position due to the strong curvature.

Figure 2A:
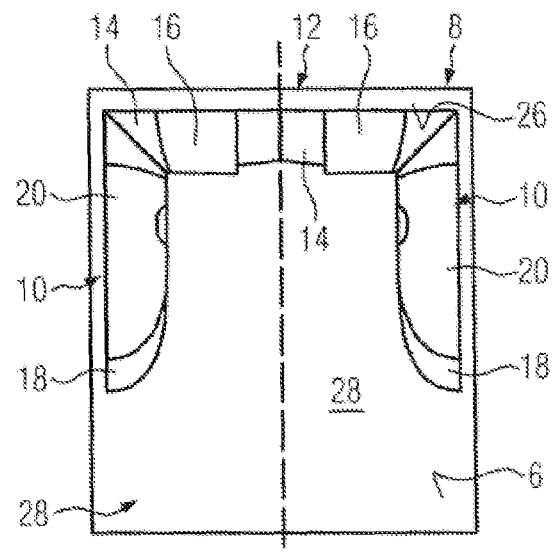
Figure 2B:
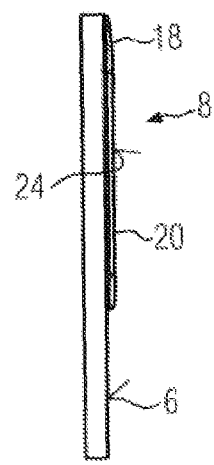
Figure 3A:
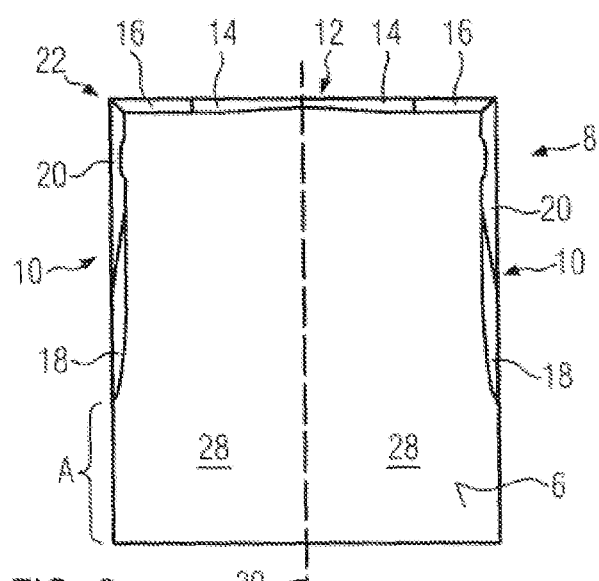
Figure 3B:
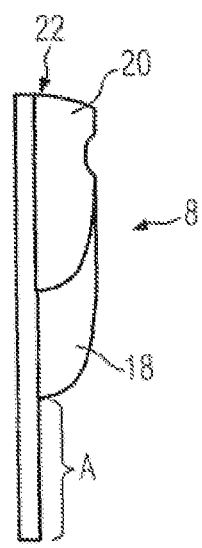
Figure 8:
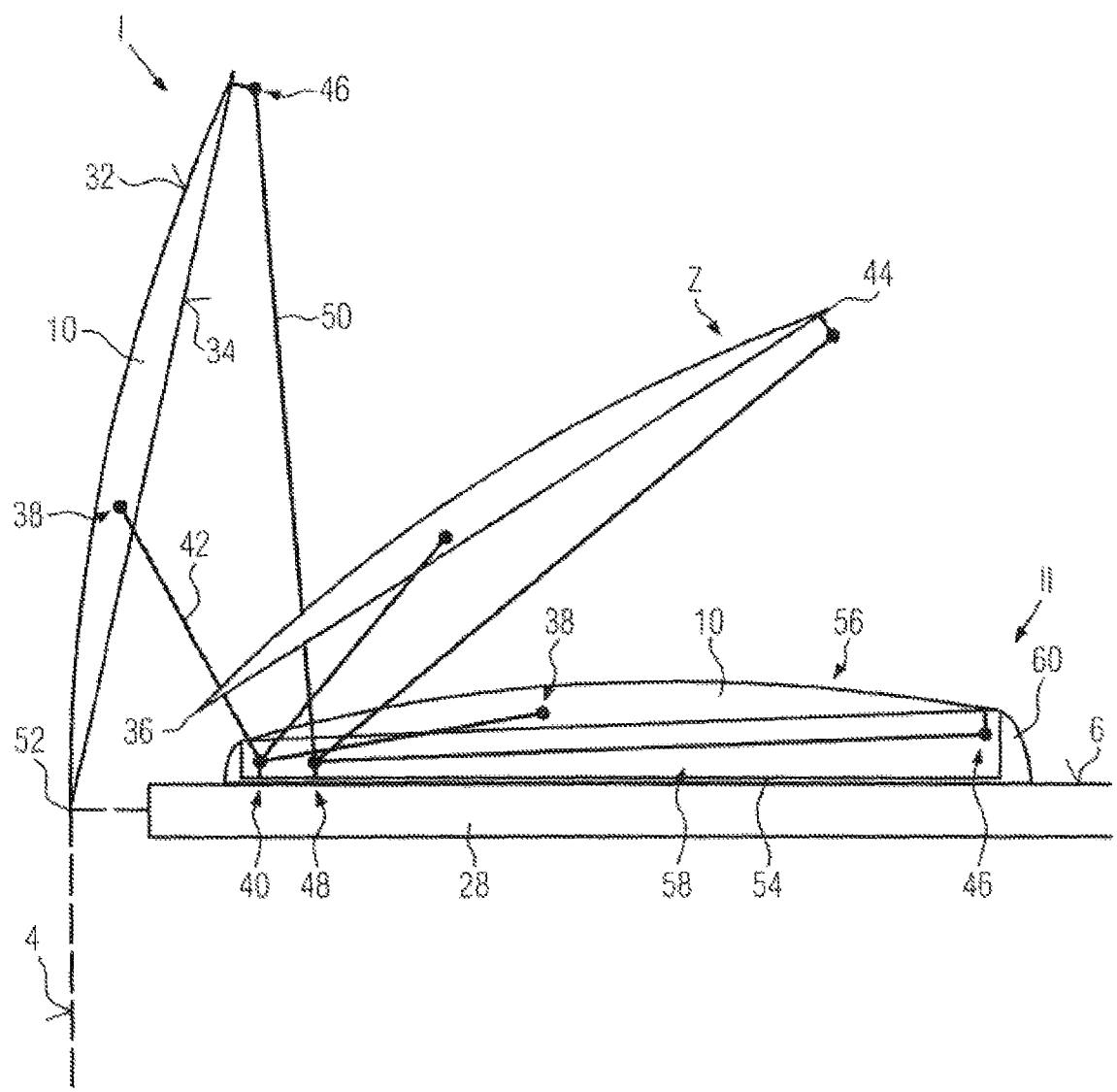
Figure 9A:
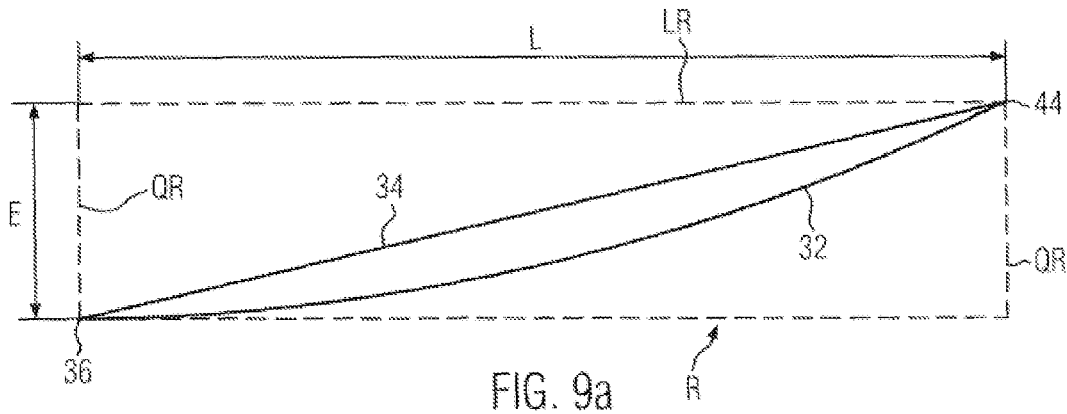
Figure 9B:
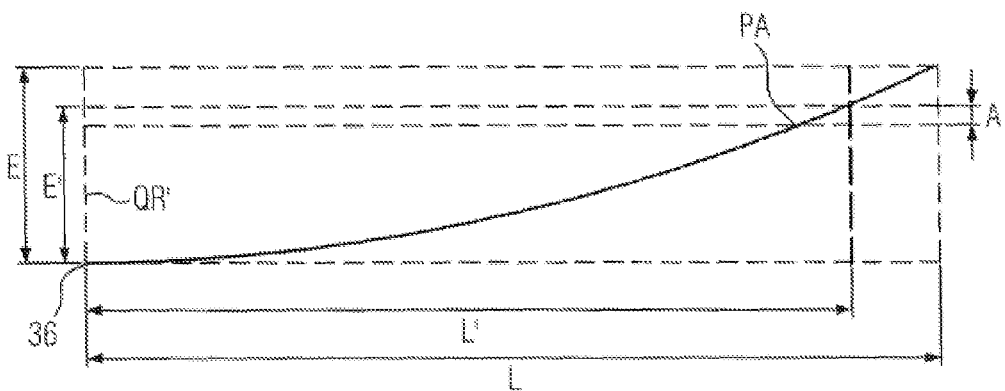
Figure 9C:
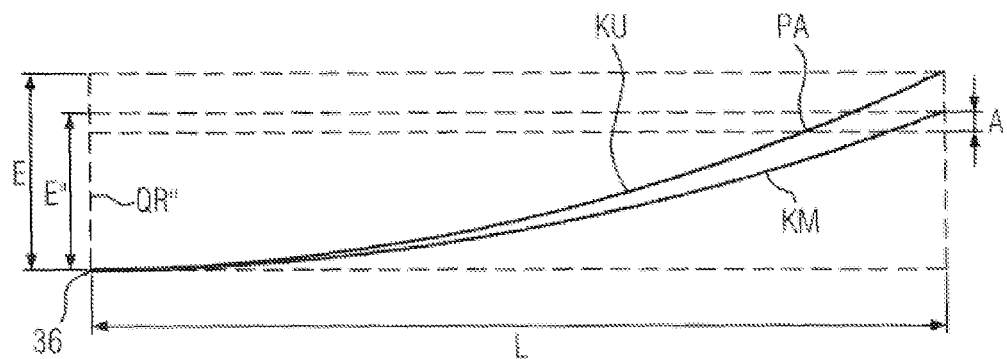
Figure 10:
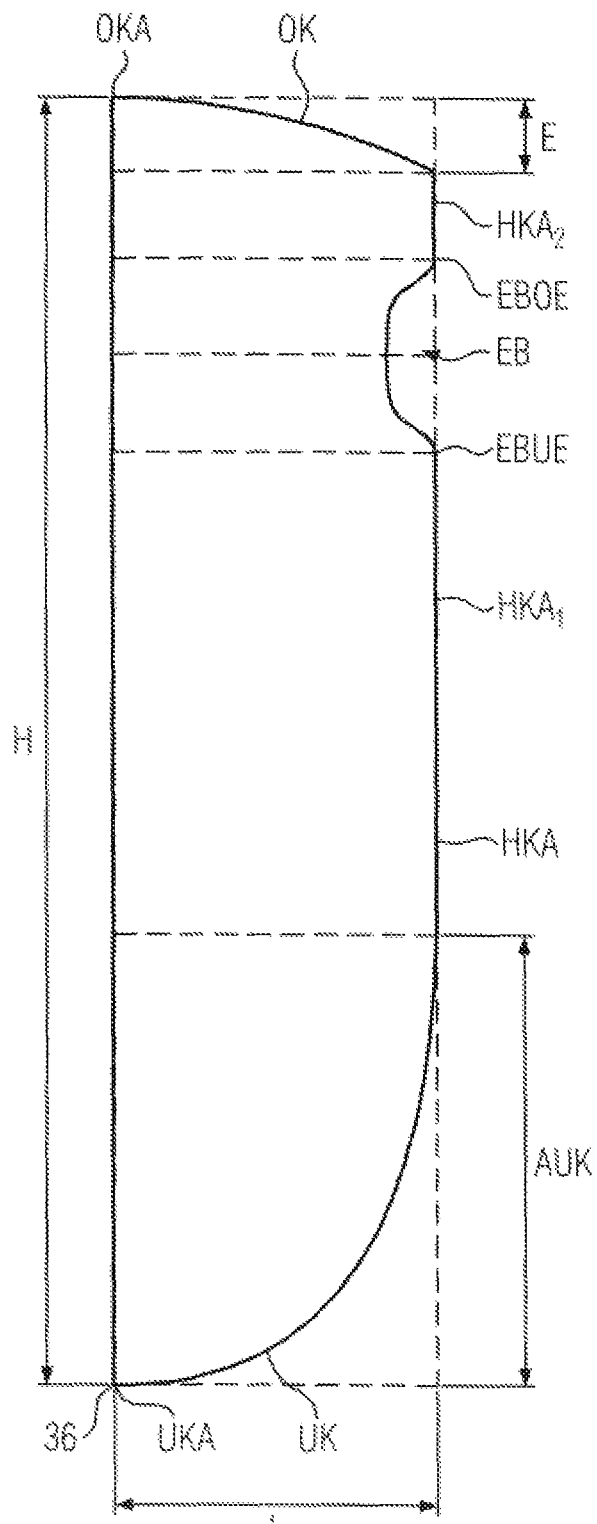
Figures 11, 12B:
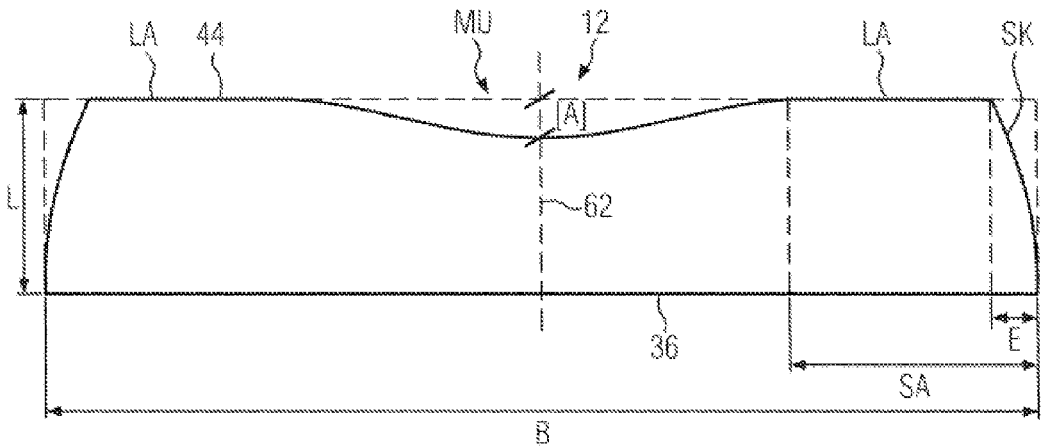
Figure 12A:
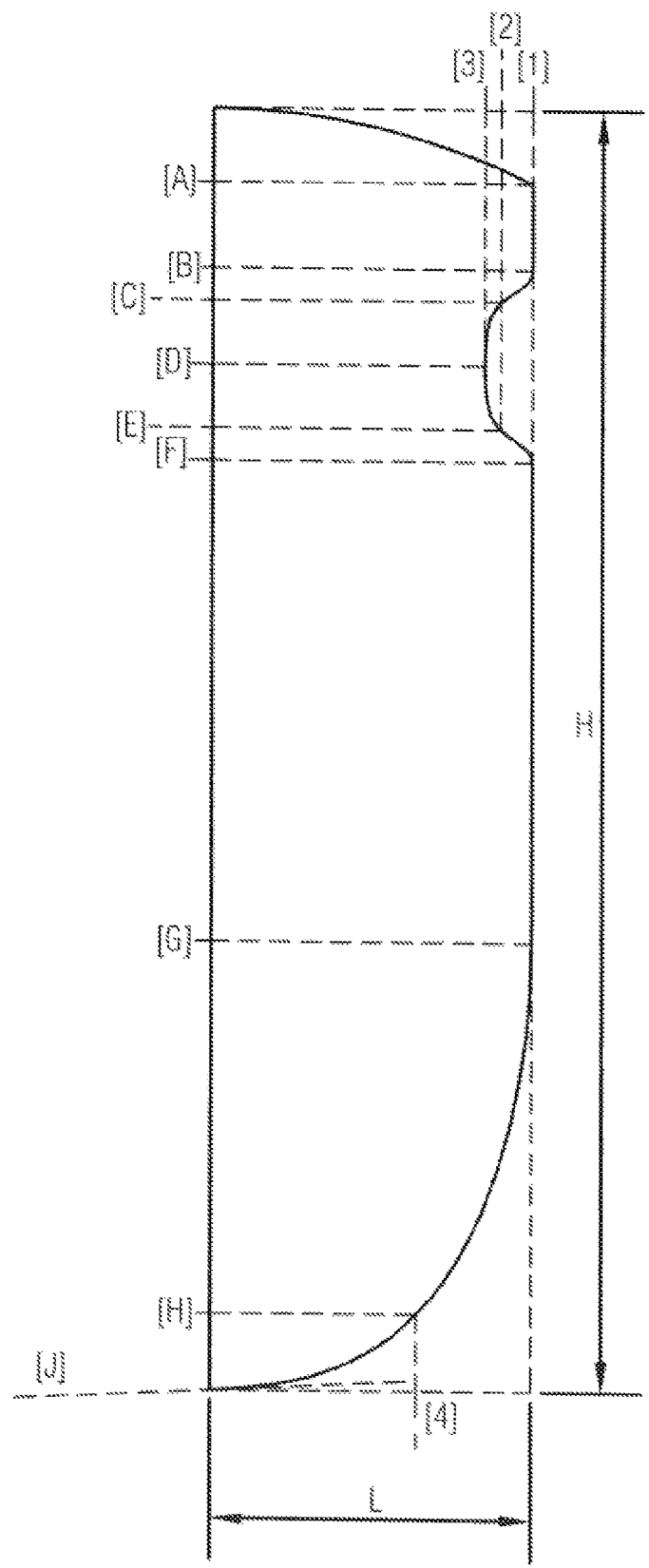
Figure 14:
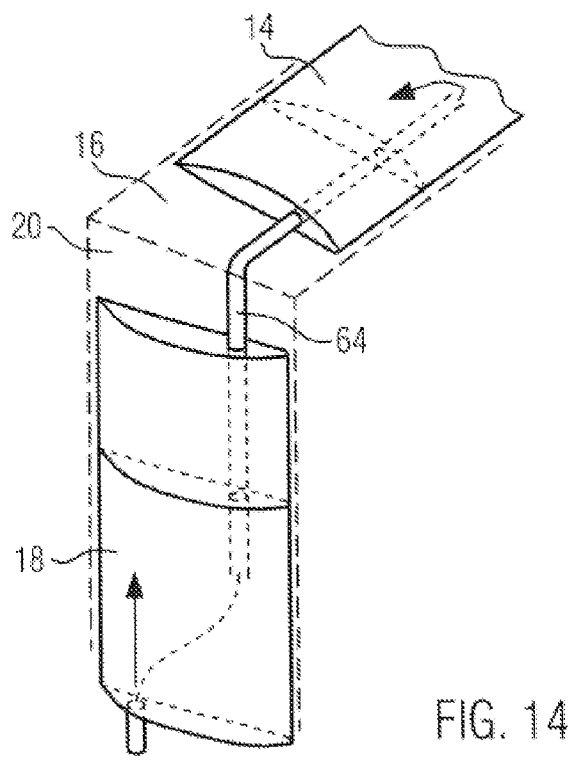
Figure 15:
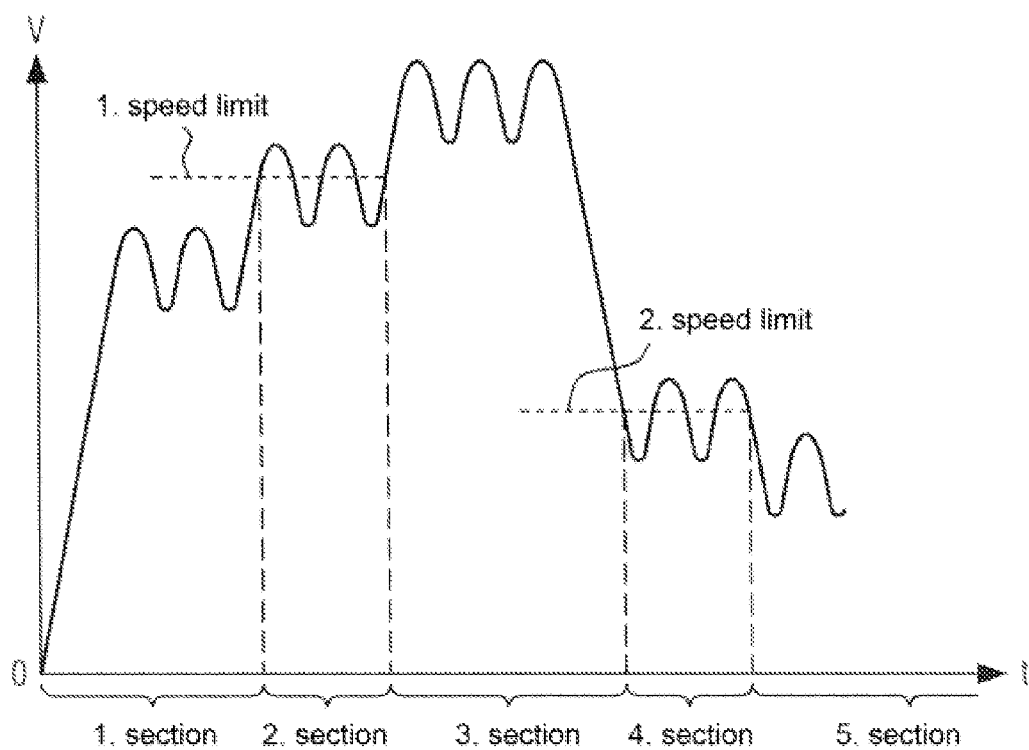
Figure 16:
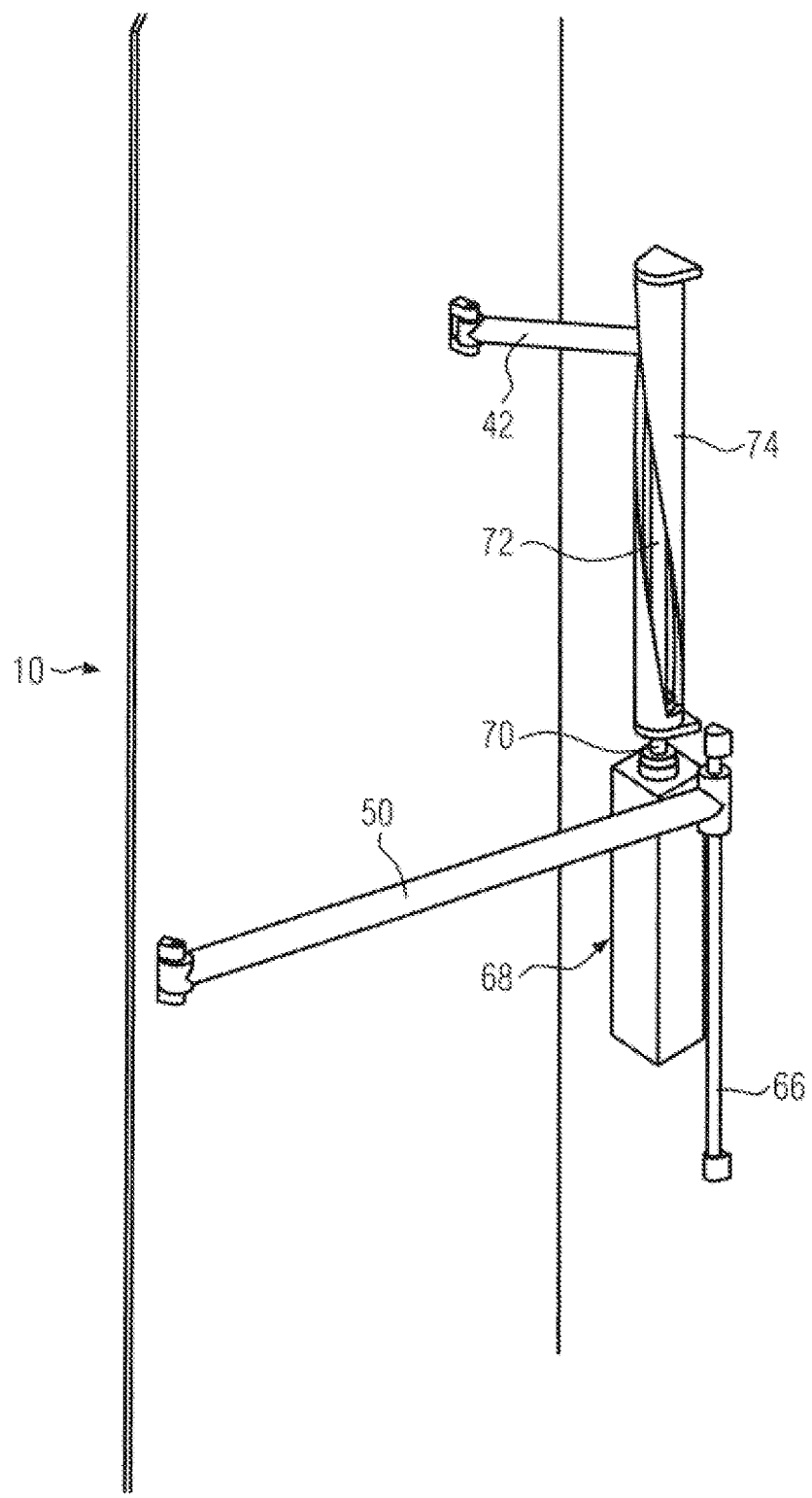

Further details and advantages of the present invention can be taken from the description in connection with the drawing. This drawing displays:

FIG. 1 a side view of a design example of a vehicle with a design example of a flow control device;

FIG. 2a a top view of the flow control device on the rear of a truck in the stowing position;

FIG. 2b a side view of the design example shown in FIG. 2a;

FIG. 3a a top view of the design example shown in FIGS. 2a and 2b in the operating position;

FIG. 3b a side view of the design example shown in FIGS. 2a to 3a in the operating position;

FIG. 4a to 4f side views in perspective of the design example shown in the FIGS. 2 and 3 regarding the movement pattern during the shift of the design example from the stowing position to the operating position;

FIG. 5 a top view of an assembly plate of the previously described design example;

FIG. 6 a top view of a structural module of the assembly blade;

FIG. 7 a sectional view along the line VII-VII according to the display in FIG. 6;

FIG. 7a a top view of a section of a vehicle when the door is swiveled open;

FIG. 8 a cross-section view according to FIG. 7 in different phases of the swiveling movement from the stowing position to the operating position;

FIG. 9a a schematic illustration to explain the geometry of the outer surface of the air deflector blade;

FIG. 9b, 9c illustrations according to FIG. 9a to explain the modifications of the contour of the outer surface;

FIG. 10 a side view of a lateral deflector blade in the operating position;

FIG. 11 a top view of a design example of a top-side air deflector blade in the operating position;

FIG. 12a a top view according to FIG. 10 with dimensioning lines whose values can be found in Table 12b;

FIG. 13a a top view according to FIG. 11 with dimensioning lines whose values can be found in Table 13b;

FIG. 14 a top view in perspective of a possible wire conduit between a lateral air deflector blade and a top air deflector blade;

FIG. 15 a graph for a possible speed pattern while the vehicle is driving to explain an activation process of the air deflector blades; and FIG. 16 a side view in perspective of a partially upright lateral blade including a mechanism with a helical groove.

FIG. 1 shows a side view of a design example on the example of a semi-trailer that forms a design example of a vehicle in the sense of the present invention and that has a box van enclosing a cargo space. The box van forms a roof area 2 as well as two longitudinal side areas 4 that are opposite to each other. A design example of a flow control device 8 extends away from a rear area 6 of the semi-trailer 1.

Details of this flow control device 8 are explained in the FIG. 2a to 3b in the two settings, i.e. the stowing position (FIG. 2a, 2b) and the operating position (FIG. 3a, 3b).

The design version has two vertically extending lateral air deflector blades 10 and a horizontally extending top air deflector blade 12 that is installed in between.

The top air deflector blade 12 consists of four elements, i.e. two air deflector elements 14 that are flexibly hinged and two sliding elements 16 that are translationally flexible in relation to each other and in relation to the associated air deflector elements 14 in a horizontal direction.

The lateral air deflector blades are formed of an air deflector element 18 and a respective longitudinally flexible sliding element 20. The sliding elements 20 are installed relocatably in the vertical dimension.

In the stowing position shown in the FIGS. 2a and 3b, the air deflector elements 14 and/or 18 are bumping into each other in corner areas 22. A substantially U-shaped closed surface, that is made up by the outer surface 24 of the lateral and the outer surface 26 of the top air deflector blades, is formed.

Through swiveling, the air deflector blades 10, 12 are set outward (FIG. 3a, 3b). As part of this swiveling movement, the air deflector blades 14, 18 are slewingly moved around hinge points, whereas the sliding elements 16, 20 are moved translationally alongside the swivel axes of the respective air deflector elements 14, 18. The swivel axes of the air deflector elements 18 of the lateral air deflector blades 10 thereby extend in the vertical dimension, i.e. in parallel to swivel axes of doors 28 of the semi-trailer 1 that are, in an ideal case, separated from each other in a vertical axis 30. The air deflector elements 14 of the top air deflector blade 12 are swiveled around the horizontal axis. Due to the sliding movement of the sliding elements 16 and/or 20, they bump against each other in the corner areas 22 in the operating position shown in FIGS. 3a and 3b. A U-shaped closed flow control area as an extension of the outer areas of the semi-trailer, i.e. the roof area 2 and the longitudinal side areas 4, is developed. Also in the operating position, a lower edge of the lateral air deflector blades 10 has a distance A, accordingly between 0% and 200% of the length of the lateral air deflector area in an upright position, from the lower edge of the rear area 6. As part of the swivel movement, the air deflector elements 14, 18 as well as the sliding elements 16, 20 are not only swiveled around their respective swivel axis, but also moved translationally outward. The kinematics is explained in FIG. 8.

FIG. 8 shows an air deflector blade, for example a lateral air deflector blade 12, in a cross-section view. The air deflector blade 10 is designed as a closed hollow element which is limited by a convex curved outer surface 32 on the outside and by a linearly extending inner surface 34 on the inside. The outer surface 32 and the inner surface 34 taper off in their end areas. At a distance of approximately one third of the overall length L of the air deflector blade 10 from a front edge 36 of the air deflector blade 10 there is a first hinge point 38 on the blade, which is coupled with an outer hinge point 40 on the fixation unit through a front joint rod 42. In the area of the rear edge 44, there is a second hinge point 46 on the blade, which is connected through an inner hinge point 48 on the fixation unit whereby a rear joint rod 50 is interposed as a linking piece.

This hinged installation of the air deflector blade 10 forms a design example of an articulation gear in this present document. The articulation gear is chosen in a way that the front edge 36 evenly nudges a rear vehicle edge 52 (presently the edge between the longitudinal side area 4 and the rear area 6—dotted lines) in an operating position marked with the reference sign I, whereby the outer surface 32 prolongs the longitudinal side area 4 in the area of the front edge 36 at first linearly in a tangential manner so that an air deflector area, that extends without interruptions from the rear vehicle edge 52 to the rear and that ends on the rear edge 44 in an inward-retracted position, forms on the outer surface 32 of the blade 10. In an intermediate position Z between the operating position I and a stowing position II, the air deflector blade 10 is already bent inwards. Due to the articulation gear, the front edge 36 is already lifted off the rear vehicle edge 52 towards the back and offset towards the inside. In the stowing position II, the linear inner surface 34 is substantially parallel to an assembly plate marked with the reference sign 54.

Details of this assembly plate are displayed in the FIG. 5 to 7. FIG. 5 thereby illustrates the arrangement of the hinge points 48 and/or 40 on the fixation unit. As evident in FIG. 5, the assembly plate 54 is L-shaped and has appropriate hinge points 40, 48 on the fixation unit for the lateral deflector blade 10 and the top air deflector blade 12, that together form a L-shaped segment 56 (see FIG. 6). The respective hinge points 40, 48 on the fixation unit are each indicated identically for the top air deflector blade 12 and the lateral air deflector blade 10.

As we can see in FIG. 6, the segment 56 consists of an air deflector element 14 and a sliding element 16. FIG. 6 shows a top view of the stowing position and illustrates, together with FIG. 7, the integration of the respective air deflector blades 10, 12 in a fitting case 58 which is limited by the assembly plate 54 at the bottom and laterally by the end caps 60, that have a convex curved contour and that all merge continuously and without interruption into the outer surface 32 of the associated air deflector blade 10, 12. As illustrated in FIG. 6, the end caps 60 move around the respective blades 10, 12 on the outside in the stowing position. The respective end caps are only missing on the vertical axis 30 because the left L-shaped segment 56 shown in FIG. 6, which is developed as a pre-assembled structural module and which can be attached to the vehicle, almost nudges onto the right segment that is also L-shaped but not shown in FIG. 6.

Thanks to the described variant, an aesthetic look is created also in the stowing position. The linear inner surface 34 largely extends in parallel to the assembly plate 54. The elements 38 to 50 of the articulation gear are covered by the end caps 60 at the top and on the edges of the blade and are therefore essentially protected against dirt. FIG. 7a further shows that a door 28, that takes in the lateral air deflector blade 10 and the segment 56 of the top air deflector blade 12, can be set to an open position swiveled by approximately 260° from the closing position discussed so far without causing the air deflector blades 10, 12 to collide with the longitudinal side area 4 of the semi-trailer. The arrangement increases the thickness of the door 28 only insignificantly. The doors 28 can still be swiveled freely towards the outside without any impairment.

FIG. 4a to 4f illustrate the setting of the air deflector blades 10, 12 from the stowing position II (FIG. 4a) already discussed before to the operating position I (FIG. 4f).

Figure 4A:
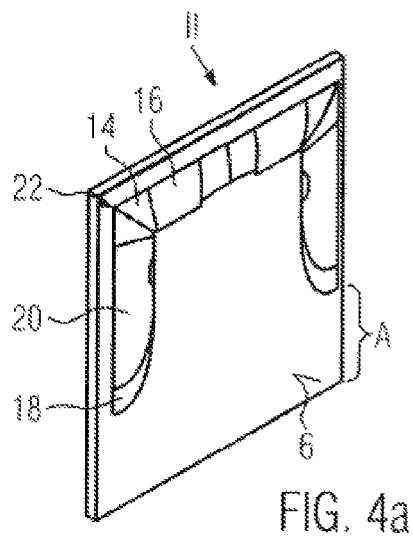
Figure 4B:
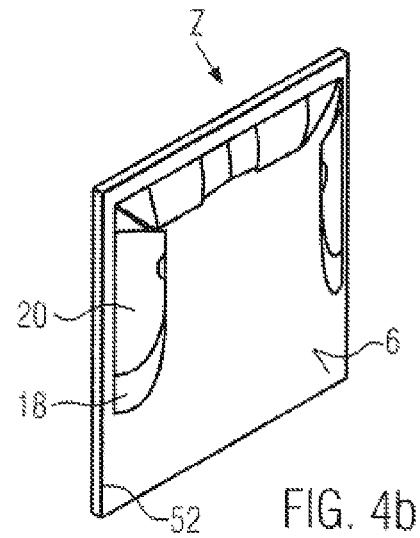
Figure 4C:
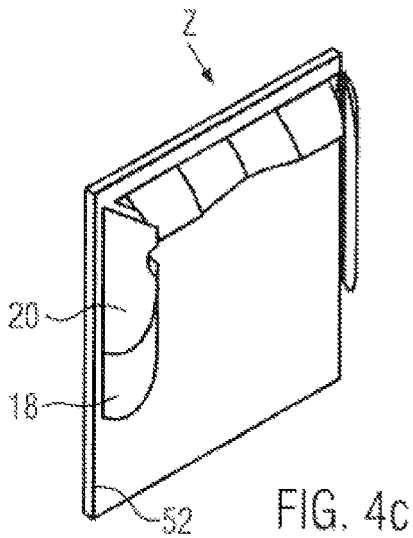
Figure 4D:
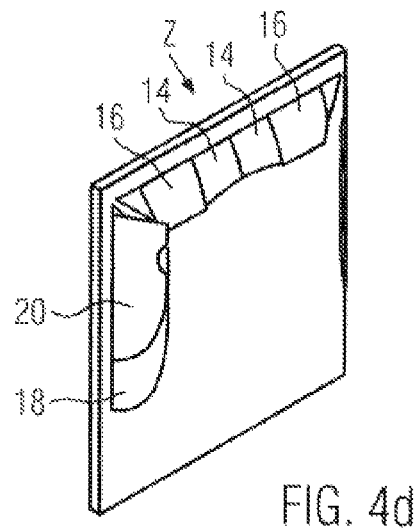
Figure 4E:
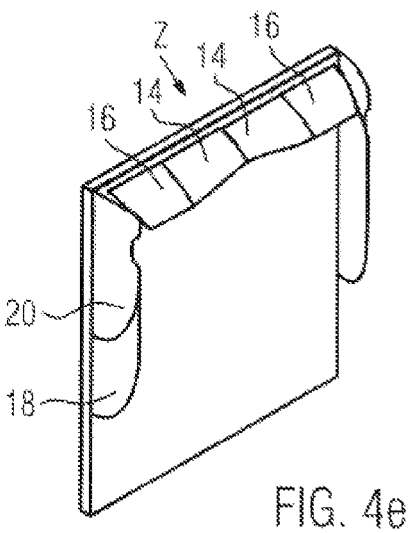
Figure 4F:
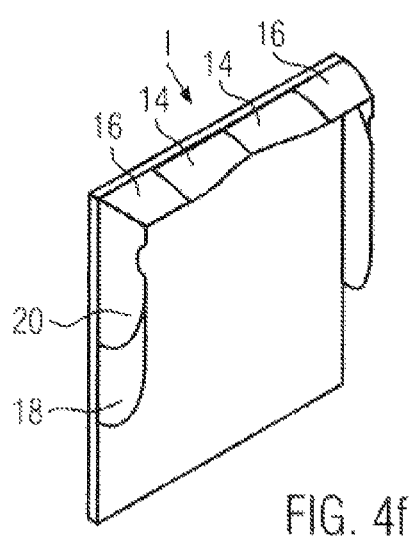

In the stowing position according to FIG. 4a, the air deflector elements 14, 18 of the respective air deflector blades 10, 12 nudge against each other in the corner area 22. The sliding elements 16 and/or 20 are located on the associated air deflector elements 14, 18. Hence, each air deflector element 14 of the top air deflector blade 12 reaches beyond the associated sliding element in a horizontal extension, whereas the sliding element 20 of the lateral air deflector blade 10 is exceeded by the air deflector element 18 of the respective air deflector blade 10 on both sides. The swivel movement is triggered by actuators that are arranged within the fitting case 58 in the stowing position II. In this process, the sliding element is, on one hand, swiveled outward and moved translationally in the manner described above under reference to FIG. 8. On the other hand, the sliding elements 16 of the top air deflector element 12 are driven outwards whereas the sliding elements 20 of the two lateral air deflector blades 10 are moved upwards. In other words, the sliding elements 16, 20 approach each other while a swivel movement of the air deflector blade 10 and/or 12 as a whole is carried out. At the end of this swivel movement, the respective air deflector blades 10, 12 are in the operating position I. The sliding elements 16, 20 nudge against each other in the corner areas 22 and now exceed an upper boundary edge of the air deflector element 18 and/or a lateral boundary edge of the air deflector elements 14 that were essentially still adjacent to each other in the corner areas 22 in the stowing position before but that contribute in any case to a U-shaped, continuously developed contour in the stowing position (see FIG. 4a).

FIG. 9a explains the design of the cross-sectional geometry of an air deflector blade 10, 12. It focuses particularly on the contour of the outer surface of the air deflector blade 10, 12. In the following, the described air deflector blade shall be a lateral air deflector blade. The respective description, however, could equally be used for the design and construction of the top-side air deflector blade 12.

The air deflector blade 10 has a length of between 350 mm and 700 mm, preferably of between 400 mm and 600 mm. Length L shall mean the extension of a longitudinal edge LR of a rectangle R which is tangentially approached by the outer surface 32 in the area of the front edge 36. The front edge 36 is thereby located in that section, i.e. sectional and/or end point, of the rectangle R where the longitudinal edge LR intersects with a transversal edge QR. The two longitudinal edges LR and the two transversal edges QR span the rectangle R. The rear edge 44 of the air deflector blade 10 lies in an end point opposite to the corner point in which the front edge 36 is located. As already mentioned, the outer surface 32 between the two edges 36, 44 is continuously curved. The transversal edge QR has a feed length E of between 0.2 and 0.3, preferably of between 0.22 and 0.24 of the length L of the longitudinal edge LR. This flow geometry proves to be advantageous to guide the air on the rear of the vehicle. There is no need to say that the front edge 36 should be installed if possible in direct contact, i.e. without interruption, with the associated surface, i.e. the roof surface 2 and/or the longitudinal side area 4 of the vehicle. In other words, in one arrangement of the air deflector blade 10, the longitudinal edge LR prolongs the longitudinal extension of the associated area 2, 4 in the operating position. On this basis, the feed length E is the degree by which the air deflector blade 10 guides the flow to the inside and to the rear of the vehicle.

The contour of the air deflector blade 10 shown in FIG. 9a can be modified experimentally when it appears that the flow drifts away prematurely from the outer surface 32. This can, for example, be caused by turbulences on the external mirrors of the towing vehicle. Practical experiments by the present inventors have shown that turbulences develop on the upper edge and on the lower edge of the lateral mirror of the towing vehicle behind the lateral mirror and on the longitudinal side surface 4 of the vehicle. In the process, the turbulence caused by the upper edge of the outside mirror usually turns towards a roof turbulence that exists on the corner between the longitudinal side area and the roof surface. Due to the spin of the two associated turbulences, there will be an area of decelerated flow in between, which can cause the flow to drift away prematurely from the contour shown in FIG. 9a. Such a drifting effect can be identified on the vehicle in an experiment under real flow conditions.

The two abovementioned roof turbulences spin in opposite directions so that an area of decelerated flow also develops in the middle of the roof area. Also here, the flow rather tends to drift away from the top-side air deflector blade 12.

The aerodynamic effect of the air deflector blade 10, 12 can now be improved by adapting the contour to the locally active flow conditions as illustrated in the FIGS. 9b and 9c. There, the blade shown in FIG. 9a is drawn into a rectangle R with dotted lines which is equivalent to the rectangle R according to FIG. 9a. A break-off point [PA] shall be the point at which the flow is observably drifting away under driving conditions (for example at a travel speed of 80 km/h). For the modification, there is further a distance [A] whose amount can be between 0.1 and 0.05 of the feed length F. The distance is greater than zero. The contour should now be modified in a way that the distance between the break-off point and the rear edge 44 locally has the length [A]. More precisely, the contour is adapted to trigger a defined amount of break-off into the shear layer in the sense of the "super-critical condition". The degree of defined break-off shall be predefined by A.

A possible correction is displayed in FIG. 9b. There, the length and the feed are adapted to the location of the break-off point while the curvature is maintained. The new feed length F' and hence the modified transversal edge QR' are formed by the distance between the longitudinal edge LR associated to the front edge 36 and the break-off point plus the distance [A]. The curvature of the original outer surface is not modified in the process and consequently there will also be a new length L'.

The second correction possibility is shown in FIG. 9c. There, the feed is changed while the length L is kept constant, which changes the curvature of the contour changes and consequently influences the situation of the break-off point. A reduced curvature from an initial contour KU to a modified contour KM leads to a shift of the break-off point towards the rear edge 44. In other words, the situation of the break-off point is adapted to the contour length. The new feed length E" and hence the modified transversal edge QR" are formed by the distance between the longitudinal edge LR, that is associated to the front edge 36, and the break-off point plus the distance [A].

In addition to the adaptation by means of one of the mentioned processes, a hybrid solution in which both the curvature and also the contour length are locally adapted is also possible. This way, the shape of the air deflector blades can be modified while maintaining the distance [A].

The lateral air deflector blade 10 in the operating position has a height of between 1200 and 2700 mm, preferably of between 1800 and 2300 mm. As illustrated by FIG. 1, the air deflector blade 10 of the invention is less high than the continuous longitudinal side surface of the vehicle that is located in front of the air deflector blade. The height of the lateral air deflector blade 10 does usually not exceed 75%, preferably 60%, of the height of the associated longitudinal side surface 4. "Height" shall thereby mean the extension in the assembled state and in the operating position in the vertical plane. This height is indicated by H in FIG. 10, whereby this figure shows the operating mode. FIG. 10 also shows a convex curved lower contour which extends from the front edge 36 with an angle between 0° and 50°, preferably between 0° and 20° and especially preferably between 1° and 10°. In case of a tilt angle greater than 0°, the lower contour K is located within a rectangle which is defined by the length L discussed before and the height H. In other words, the area of the lower contour UK, that is close to the edge, is tilted upwards. The lower contour UK, however, substantially approaches the horizontal plane, that is situated mainly in parallel to the extension of the length L, in a tangential way. Furthermore, the upper part of the lower contour UK merges tangentially into a vertically linear rear edge section HKA. This rear edge section HKA extends in the vertical plane.

In the illustrated design example of a lateral air deflector blade 10 according to FIG. 10, the rear edge section HKA extends in an interrupted manner from an indentation EB up to a point that has a distance from a top edge OKA of the air deflector blade 10 equivalent to the feed length E discussed before. The convex curved contour UK has a height extension AUK, whereby AUK indicates the distance dimension between the bottom UKA (intersection with front edge 36) and the top end of the lower contour UK, which amounts to approximately 500 to 900 mm, preferably of between 600 and 800 mm. This indicates the length of the linear rear edge section HKA including the indentation EB to (H-HUK-E). In the illustrated design example, the indentation EB is limited by segments $HKAS_1$ and $HKA_2$ of the rear edge section. The indentation EB is located in the upper area of the lateral air deflector blade 10. The center of the indentation is located approximately 400 mm above a top edge OKA of the air deflector blade 10. An upper end EBOE of the indentation has a distance of between 200 and 300 mm from a top edge OKA. At this top end EBOE, the indentation extends away from the upper segment $HKA_2$ of the linear rear edge section HKA. A lower end EBUE of the indentation EB has a distance of between 500 and 600 mm from the top edge OKA and extends away from the lower segment $HKA_1$ of the linear rear edge section HKA there. Where the setting was adjusted to the distance to the top edge OKA as mentioned above, this was ensured under consideration of the top edge OKA as the point at which the upper edge OK forms the front edge 36. Here, the highest point of the lateral air deflector blade 10 is formed.

As can be seen in FIG. 10, the upper edge OK is developed in a downward curved way. The variant is equivalent to the contour described with reference to FIG. 9a. Accordingly, the upper edge develops a downward-drawn convex curved feed. This feed preferably extends at the front edge 36 from a horizontal line. The feed, however, can also be slightly tilted downward by up to 5° in relation to the horizontal plane. There is no need to say that the front edge 36 in the vertical plane is shaped linearly and that it extends strictly in the vertical plane.

As illustrated in FIG. 11, the top-side air deflector blade 12 shown in the top view and in the operating position has an outline on its rear edge. The contour of the top-side air deflector blade 12 is symmetric to a central longitudinal axis 62 that is equivalent to the central longitudinal axis of the vehicle in the direction of travel. On the rear edge 44, the top-side air deflector blade 12 forms two linear lateral sections LA which extend in parallel to the front edge 36. The side edges have a lateral contour SK as described above with reference to FIG. 9. Accordingly, the lateral contours are convex curved and extend on the front edge 36 with an angle smaller than 5°, preferably with an angle of 0°, from a parallel line to the central longitudinal axis 62. The lateral contours SK are respectively convex curved towards the inside and develop a feed with the feed length E as described with reference to FIG. 9a. As further shown in FIG. 11, the trough MU extends with a lateral distance SA of between 0.20 and 0.30, preferably of 0.23 and 0.27 of a width B of the upper air deflector blade 12, from the linear lateral section LA. This lateral distance SA is ablated at the front edge 36, i.e. on the point of maximum extension of the air deflector blade 12 in the width direction. The trough MU has a concave trough bottom which is evenly arranged by means of eventually convex trough edges in proximity to the linear lateral section LA in the form of a tangent and which merges into this lateral section. In its center, i.e. on the central longitudinal axis 62, the trough MU has a feed with the distance [D] of presently 0.2 of the length L, whereby L is presently indicated with 500 mm and whereby the width of the trough MU amounts to 0.5 of the width B. The dimension [A] can amount to between 0.15 and 0.25 of the length L, preferably between 0.18 and 0.22 of the length L.

Further details as well as dimensions and modifications of the lateral air deflector blade 10 and/or the top-side air deflector blade 12 can be derived from FIGS. 12a and 13a as well as the tables 12b and/or 13b included in these figures. They indicate absolute and relative dimensions with the individual measurement points indicated in FIGS. 12 and 13.

With regard to the length and the feed length, reference is made again to FIG. 9a and the special description presented in this respect. The dimensions for the length L and the feed length E are further mentioned in Claim 8.

FIG. 14 illustrates a design example for pressurized air supply within the air deflector blades 10, 12; the solid lines respectively show the air deflector elements 14, 18. The dotted lines represent the planned sliding elements 16, 20 in the operating position. As shown, between the air deflector elements 18, 14, there is a tube piece 64 bent by approximately 90°, which is tiltably and relocatably guided in the air deflector elements 14, 18 and which forms a section of a pneumatic line to transfer pressurized air from the bottom through the lateral air deflector blade 10 to the top-side air deflector blade 12. Due to their design, the air deflector blades 10, 12 are linked to each other by a form-locked connection.

FIG. 15 illustrates the control of the air deflector blades 10, 12 regardless of the speed of the vehicle. The latter is plotted on the horizontal axis while the time is displayed on the coordinate.

At the time t=0, the vehicle starts moving. In a first section (for example a feeder road to the highway), the vehicle drives below a first speed limit. This speed limit is stored in the control system and triggers the shift of the air deflector blades from the stowing position to the operating position. If a speed signal that indicates the first speed limit is registered by the control system, the positioning of the air deflector blades 10, 12 will not yet be triggered directly. Rather, the control unit has a delay module that checks whether the first speed limit will be undercut again in a predefined time interval. In this case, no signal to trigger the shift of position will be sent out. Accordingly, the air deflector blades 10, 12 remain in the stowing position in the second section. In this second section, the measured speed varies in the range around the first speed limit whereby it is both exceeded and undercut. The speed limit is always exceeded for a shorter time than indicated by the predefined period.

In the third section, a much higher speed is generated. Although the actual speed varies, it does never undercut the first speed limit. After that, the air deflector blades 10, 12 are put out and brought into the operating position in an initial phase of the first section and after the end of a predefined period.

In the fourth section, the speed decreases. However, it varies in the range around a second speed limit that is lower than the first speed limit in the shown design example. The second speed limit is undercut in the fourth section for a shorter time than the respective predefined period. This way, the control unit sends out no signal that triggers the air deflector blades 10, 12 to be shifted back from the operating position to the stowing position. Only in the fifth section, the second speed limit is permanently undercut. Hence, a signal is sent out at the beginning of the fifth section and after the end of the predefined time interval by means of which the air deflector blades 10, 12 are shifted back to the stowing position by their associated actuators.

The described control unit prevents the air deflector blades 10, 12 from being permanently opened and closed in case of speed variations in the range of the speed limits.

FIG. 16 shows a design example for the activation of the lateral air deflector blade 10. As can be seen, the air deflector element 18 is installed on an axial rod 66 by means of the rear joint rod 50 and can be moved in an axial direction in relation to this axial rod 66. On the level of this axial rod 66 there is a lifting cylinder shaped as a double-acting pneumatic cylinder 68 whose piston rod shapes a swivel axis body 70. This swivel axis body 70 is firmly connected with the front joint rod 42 which is hinged to the air deflector blade 10. The front joint rod 42 passes through a helical groove 72 that is recessed in a stationary sleeve 74 which essentially takes up the swivel axis body.

When the pneumatic cylinder 68 is activated, the swivel axis body 70 is moved accordingly in the axial direction within the sleeve. The air deflector blade 10 is moved translationally in the longitudinal direction of the axial rod 66 in the process. A the same time, the helical groove 72 makes a swivel movement that causes a further outward shift in relation to the axial extension of the axis rod 66 although it is to be installed in parallel to the swivel axis of the axis rod 66.

The design example shown in FIG. 16 is a possible and relatively simple and effective arrangement to set the lateral air deflector blade in an upright position. Through activation of the pneumatic cylinder, the air deflector blade is therefore not only swiveled, but at the same time also lifted so that the air deflector blade with its upper edge can be positioned evenly on the upper edge of the vehicle in the operating position and arranged in the stowing position at a distance to the outer contour of the rear of the vehicle.

LIST OF REFERENCE SIGNS

1 Semi-trailer
2 Top area
4 Longitudinal side area
6 Rear area
8 Flow control device
10 Lateral air control wing
12 Upper air control wing
14 Air deflector element of the top air deflector blade 12
16 Sliding element of the top air deflector blade 12
18 Air deflector element of the lateral air deflector blade 10
20 Sliding element of the lateral air deflector blade 10
22 Corner area
24 Outer surface of the lateral air deflector blade 10
26 Outer surface of the top air deflector blade 12
28 Doors
30 Central vertical axis
32 Outer area
34 Inner area
36 Front edge
38 First hinge point on the blade
40 External hinge point on the fixation unit
42 Front joint bar
44 Rear edge
46 Second hinge point on the blade
48 Internal hinge point on the fixation unit
50 Rear joint bar
52 Rear vehicle edge
54 Assembly plate
56 Segment of the top-side air deflector blade 12
58 Fitting case
60 End cap
62 Central longitudinal axis
64 Pipe section
66 Axial rod
68 Pneumatic cylinder
70 Swivel axis body
72 Helical groove
74 Sleeve
I Operating position
II Stowing position A Distance
[A] Trough depth
AUK Distance dimension of the lower contour LC
B Width of the top-side air deflector blade 12
E Feed length
EB Indentation
EBOE Upper end of the indentation ID
EBUE Lower end of the indentation ID
H Height
HKA Rear edge section
$HKA_1$ Lower segment of the rear edge section RES
$HKA_2$ Upper segment of the rear edge section RES
KM Modified contour
KU Initial contour
L Length
LA Lateral section
LR Longitudinal edge
MU Trough
OK Upper edge
OKA Top edge
PA Break-off point
R Rectangle
UK Lower contour
UKA Bottom edge
QR Transversal edge
SA Lateral distance
SK Lateral contour
Z Intermediate position

What is claimed is:

1. Flow control device for a truck, that comprises at least one air deflector blade (10, 12) that can be arranged in an operating position as a contour extension on a rear truck end (52), that forms an air deflector area and that is installed in a way as to be flexibly tiltable around a swivel axis by means of an adjustment unit between the operating position (I) and a stowing position (II),
wherein the air deflector blade (10, 12) comprises at least one air deflector element (14, 18) and at least one flexible sliding element (16, 20) that can be moved translationally in relation to the air deflector element (14, 18) in parallel to the swivel axis and is installed on the air deflector element (14, 18); and
wherein the at least one air deflector blade comprises two lateral air deflector blades (10) for flow control on opposite lateral areas (4) of the truck (1) and one top-side air deflector blade (12) for flow control on a roof area (2) of the truck (1), whereby each lateral air deflector blade (10) comprises an air deflector element (18) and a flexible sliding element (20), whereby the top-side air deflector blade (12) comprises two air deflector elements (14) and two sliding elements (16) and the flexible sliding element (20) of each lateral air deflector blade (10) is adjacent to a sliding element (16) of the top-side air deflector blade (12) in the operating position (I) to form a corner area of the flow control device.

2. Flow control device according to claim 1, wherein at least one of the air deflector blades (10) can be lifted by means of a swivel axis body (70), which is enclosed by a sleeve (74) equipped with a helical groove (72) that is penetrated by a joint rod (42) connected to the swivel axis body (70) and the respective air deflector blade (10).

3. Flow control device for a truck, that comprises at least one air deflector blade (10, 12) that can be arranged in an operating position as a contour extension on a rear truck end (52), that forms an air deflector area and that is installed in a way as to be flexibly tiltable around a swivel axis by means of an adjustment unit between the operating position (I) and a stowing position (II), wherein the air deflector blade (10, 12) comprises at least one air deflector element (14, 18) and at least one flexible sliding element (16, 20) that can be moved translationally in relation to the air deflector element (14, 18) in parallel to the swivel axis, wherein sliding elements (16, 20) that are adjacent to each other form a corner area (22) in the operating position (I) and wherein adjacent air deflector blades are mechanically coupled to each other at their non-attached end in the corner area.

4. Flow control device for a truck (1) according to claim 3, wherein the air deflector blade (10, 12) comprises a top-side air deflector blade (12) which is divided by and symmetric to a central longitudinal axis (62).

5. Flow control device for a truck (1) according to claim 3, further comprising at least one assembly plate (54) on which the air deflector blade (10, 12) is installed tiltably and with an actuator.

6. Flow control device for a truck, that comprises at least one air deflector blade (10, 12) that can be arranged in an operating position as a contour extension on a rear truck end (52), that forms an air deflector area and that is installed in a way as to be flexibly tiltable around a swivel axis by means of an adjustment unit between the operating position (I) and a stowing position (II), wherein the air deflector blade (10, 12) has an outer area (32) which forms, in a cross-section view, a tangent on a longitudinal edge (LE) of a rectangle (R) at a front edge (36) of the air deflector blade (10, 12) and which is located in a corner point of the longitudinal edge (LE) with a transversal edge (TRE) of the rectangle (R) in whose opposite corner point there is a rear edge (44) of the air deflector blade (10, 12), whereby the outer area (32) between the front edge and the rear edge (36, 44) is convex curved and whereby the longitudinal edge (LE) of the rectangle (R) has a length (L) of between 350 and 700 mm, and whereby the transversal edge (TRE) has a feed length (F) of between 0.2 and 0.3 of the length (L) of the longitudinal edge (LE) and
further comprising an indentation (ID) extending away in a linear rear edge section (RES), which is installed in an upper area of a lateral air deflector blade (10).

7. Flow control device for a truck (1) according to claim 6, comprising a top-side air deflector blade (12) with a trough (TR) that is symmetric to a central longitudinal axis (62) in the operating position (I) and that is formed as a recess in relation to linear lateral sections (LS) of a rear edge (44) of the top-side air deflector blade (12).

8. Flow control device for a truck (1) according to claim 6, wherein the lateral air deflector blade (10) in the operating position (I) has a height of between 1,200 and 2,700 mm.

9. Flow control device for a truck (1) according to claim 6, wherein the indentation (ID) is limited on both sides by segments of the linear rear edge section ($RES_1$, $RES_2$).

10. Flow control device for a truck (1) according to claim 9, wherein an upper end (UEID) of the indentation (ID) with a distance of between 200 and 300 mm from a top edge (TE) of the lateral air deflector blade (10) extends away from the linear rear edge section (RES) and/or extends away from the linear rear edge section (RES) with a lower end (LEID) at a distance of between 500 and 600 mm from the top edge (TE).

11. Flow control device for a truck (1) according to claim 6, wherein an upper edge (UE) of the lateral air deflector blade (10) is formed by a convex curved feed that is retracted downward and that levels off with a <5° angle in relation to the horizontal plane.

12. Flow control device for a truck (1) according to claim 7, wherein the trough (TR) extends with a lateral distance (LD) of between 0.2 and 0.3, of a width (W) of the top-side air deflector blade (12), from the linear lateral sections (LS).

13. Flow control device for a truck (1) according to claim 12 wherein the trough (TR) has a trough depth ([D]) of between 0.15 and 0.25 of the length (L).

14. Flow control device for a truck (1) according to claim 7, wherein a lateral contour (LAC) of the top-side air deflector blade (12) is formed by a convex curved feed that is retracted to the inside and that levels off with an angle of <5° towards a parallel line of the central longitudinal axis (62).

15. Flow control device for a truck (1) according to claim 7, wherein movement of the lateral air deflector blade (10) is mechanically coupled with movement of the top-side air deflector blade (12).

16. Flow control device for a truck (1) according to claim 6 wherein two lateral air deflector blades for flow control on opposite lateral areas (4) of the truck (1) are each formed as uniform air deflector blades (10) and that only an upper air deflector blade (12) for flow control on a roof area (2) of the truck (1) comprises an air deflector element as well as one flexible sliding element (16; 20) installed on the edge.

* * * * *